United States Patent [19]

Takeuchi

[11] Patent Number: 4,614,261
[45] Date of Patent: Sep. 30, 1986

[54] DAMPER DISC ASSEMBLY

[75] Inventor: Hiroshi Takeuchi, Higashiosaka, Japan

[73] Assignee: Kabushiki Kaisha Daikin Seisakusho, Neyagawa, Japan

[21] Appl. No.: 702,207

[22] Filed: Feb. 15, 1985

[30] Foreign Application Priority Data

Feb. 17, 1984 [JP] Japan .................................. 59-29255

[51] Int. Cl.$^4$ .............................................. F16D 3/14
[52] U.S. Cl. ..................................... 192/106.2; 464/68
[58] Field of Search ............... 192/106.2, 106.1, 70.16, 192/70.17, 70.18; 464/73, 67, 68, 76

[56] References Cited

U.S. PATENT DOCUMENTS

| | | | |
|---|---|---|---|
| 4,396,103 | 8/1983 | Loizeau ............................ | 192/106.2 |
| 4,470,494 | 9/1984 | Takeuchi ......................... | 192/106.2 |
| 4,537,295 | 8/1985 | Fadler et al. ..................... | 192/106.2 |

Primary Examiner—George H. Krizmanich
Attorney, Agent, or Firm—Armstrong, Nikaido, Marmelstein & Kubovcik

[57] ABSTRACT

A damper disc assembly including torsion springs interposed between flanges formed on a central hub and side plates; characterized by that a cam freely rotatable about an axis parallel to a disc center line is provided between said internal tooth and said external tooth through a disc circumferential play, a longitudinal portion of the cam is made engage between said external tooth and said internal tooth when a torsion is produced between the inner side flange and the outer side flange, and a spring member is provided, which elastically urges the cam to such an extent that the cam longitudinal portion is kept engaged when an angular velocity at which said torsion is released is high and the portion is disengaged when the angular velocity is low.

5 Claims, 8 Drawing Figures

DAMPER DISC ASSEMBLY

FIELD OF THE INVENTION

This invention relates mainly to a damper disc assembly suitable for an automobile clutch disc.

DESCRIPTION OF THE PRIOR ART

As a damper disc having a multi-stage rigidity & multi stage hysteresis torque characteristic, a damper disc has conventionally been known, in which an outward integral flange of a hub is divided into two: an inner side flange and an outer side flange, sub-side plates in addition to annular side plates are fitted, and they are connected through many kinds of torsion springs, thus providing a twist-angle $\theta$/twist-torque T characteristic as shown in FIG. 1.

In a damper disc having the characteristic as shown in FIG. 1, a torsional rigidity varies in three steps from a neutral state to a maximum torsion, and at the same time a hysteresis torque varies in two steps. Here, the torsional rigidity is set at a low value and the hysteresis torque is also set at a low value in order to absorb a torque vibration of low torque in a low twist angle area $(0 \sim \theta_1)$. For this reason, in case when the damper disc is employed in a vehicle clutch disc, this characteristic in the low torque angle area is effective for countermeasures against noise in a low speed operation such as an idling. On the contrary, disadvantages such as a rolling of vehicle body etc. will be induced and aggravated at the time of tip-in/tip-out (slight sepping and releasing operation of acceleration pedal being done rapidly) during running.

SUMMARY OF THE INVENTION

(Object of the Invention)

An object of this invention is to provide a damper disc which can surely absorb a torque fluctuation without inducing or aggravating disadvantages such as the rolling of vehicle body etc. even when an abrupt torque fluctuation occurs at the time of the tip-in/tip-out in such a manner that, when returning from the high twist angle area in case of a large twisting angular velocity, a state of torque moves directly to a minus side second-stage rigidity area without passing a first-stage rigidity area having the low twist torque & low hysteresis torque characteristic.

(Composition of the Invention)

In a damper disc assembly, in which an outward flange of a hub is divided into two: an inner side flange and an outer side flange, an external tooth of the inner side flange is made mesh with an internal tooth of the outer side flange with circumferential clearances provided therebetween and at the same time the inner side flange is elastically connected to the outer side flange through a weak first torsion spring a center line of which extends in a circumferential direction, side plates are disposed on both sides of the flanges and at the same time the outer side flange is elastically connected to the side plates through a strong second torsion spring extending in a circumferential direction; a damper disc assembly including the following items as its mandatory requirements:

(a) A cam freely rotatable about an axis parallel to a disc center line is provided between said internal tooth and the external tooth through a disc circumferential play.

(b) A longitudinal portion of the cam is made engage between said external tooth and internal tooth when a torsion is produced between the inner side flange and the outer side flange.

(c) A spring member is provided, which elastically urges the cam to such an extent that the cam longitudinal portion is kept engaged when an angular velocity at which said torsion is released is high and the portion is disengaged when the angular velocity is low.

DETAILED DESCRIPTION OF THE INVENTION

Figure 2:
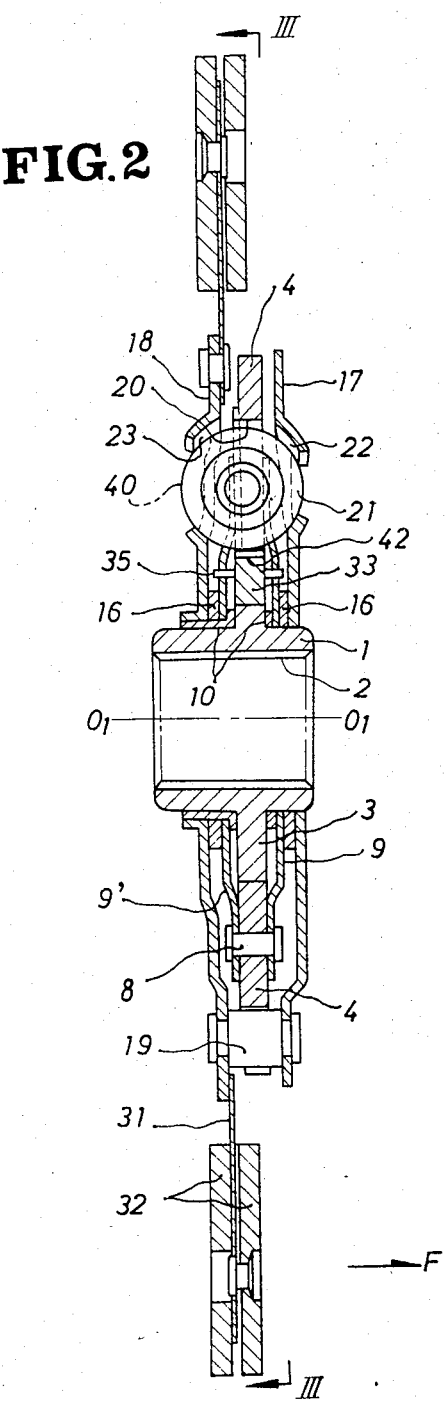
FIG. 2 is a vertical sectional partial view in case when the damper disc assembly according to this invention is employed in an automobile clutch disc.
Figure 4:
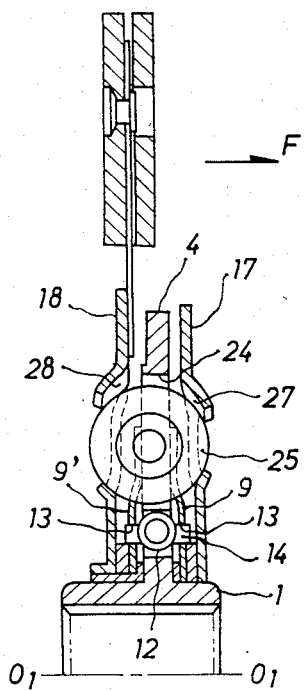
FIG. 4 is a sectional view taken on a line IV—IV of FIG. 3.
Figure 3:
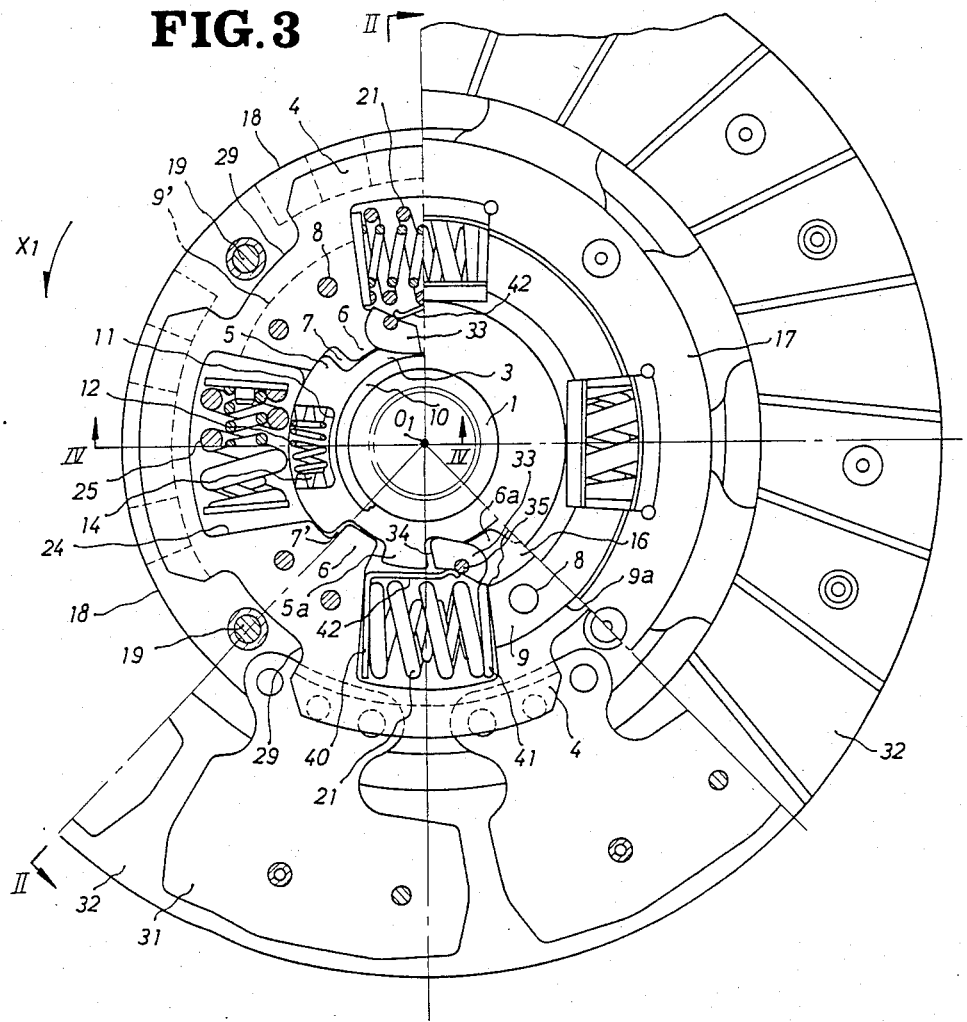
FIG. 3 is a partial sectional view taken on a line III—III of FIG. 2.

FIG. 2 is the vertical sectional partial view in case when the damper disc according to this invention is employed in the automobile clutch disc, and corresponds to the sectional view taken on a line II—II of FIG. 3 which is the partial sectional view taken on the line III—III. Further, FIG. 4 is the sectional view taken on the line IV—IV of FIG. 3. Here, an arrow F directs in a front side and $0_1$—$0_1$ is a disc center line.

In FIG. 2, a spline hub 1 spline fits onto a horizontal output shaft (not shown) through an inner peripheral internal spline 2 and has an inner side flange 3 integrally. On an outer peripheral side of the inner side flange 3 an outer side flange 4 is disposed on the same vertical surface, and an external tooth 5 provided on an outer periphery of the flange 3 meshes rotatably with an internal tooth 6 with circumferential clearances 7 and 7' left therebetween as shown in FIG. 3. Further, a pair of sub-plates 9 and 9' are fastened to both front and rear sides of the outer side flange 4 by a sub-pin 8. The sub-plates 9 and 9' are made of a metal having a radial segmental projection 9a, and its inner peripheral end face fits slidingly onto an outer peripheral surface of the hub 1 to support the outer side flange 4 concentrically with the hub 1. Friction members 10 are interposed between inner peripheral portions of the sub-plates 9, 9' and the inner side flange 3. First torsion springs 12 (first-stage springs) are compressedly installed in two notches 11 provided on an outer periphery of the inner side flange 3 in such positions that their center lines are put along the disc circumferential direction, and portions (FIG. 4) projecting to both side of both end washers 14 fit in notches 13 provided on the sub-plates 9 and 9'.

As shown in FIG. 2, a retaining plate 17 and a clutch plate 18 are disposed through friction washers 16 on outer side surfaces of the sub-plates 9 and 9' opposite to the inner side flange 3, and outer peripheral portions of the both plates 17 and 18 are integrally connected by a stop pin 19. Second torsion springs 21 (second-stage springs) are compressedly installed in two holes 20 provided on the same circumference of the outer side flange in such positions that their center lines extend in the circumferential direction, and portions of the spring 21 projecting from the hole 20 fit in holes 22 and 23 provided on the both plates 17 and 18. Circumferential positions of both disc circumferential end faces of the holes 20, 22 and 23 align each other under a neutral state, and in this instance both end faces of the spring 21 press on circumferential both end faces of the holes 20, 22 and 23.

On the outer side flange 4 further another holes 24 (FIG. 4) are provided at two places on the same circumference, and torsion springs 25 (third-stage springs) are incorporated in the holes 24 in such positions that their center lines extend in the circumferential direction. Portions of the spring 25 projecting from the hole 24 fit in holes 27 and 28 provided on the both plates 17 and 18, and the third spring 25 presses on both disc circumferential end faces of the both holes 27 and 28. The hole 24 is made shorter in its disc circumferential length than the holes 27 and 28, and as the result circumferential clearances are formed between the hole 24 and the spring 25 under the neutral state as shown in FIG. 3.

Incidentally, the stop pin 19 is disposed in a notch 29 provided on an outer periphery of the outer side flange 4 with disc circumferential clearances left therebetween. Further, facings 32 are fixed through a cushioning plate 31 to an outer periphery of the clutch plate 18, and the facing 32 is disposed between a not-shown engine side flywheel and a not-shown clutch case side pressure plate.

Figure 5:
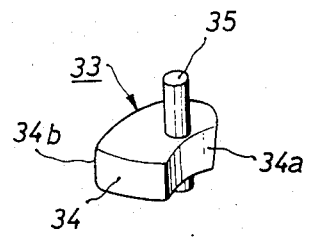
FIG. 5 is an oblique view of a cam.

Further, in the damper disc assembly according to the present invention, a cam 33 is arranged in between the inner side flange 3 and the outer side flange 4, and cam 33 is provided symmetrically on two places of the same disc circumference as shown in FIG. 3. The cam 33 has a cam surface 34 having a complex curved shape as shown in FIG. 5, and integrally includes a pin 35 projecting both sides in parallel with the cam surface 34. As shown in FIG. 2, the pin 35 is rotatably supported by holes of the both sub-plates 9 and 9' in parallel with the center line $0_1$—$0_1$. A disc circumferential end portion of the cam surface 34 is formed into a circular arc locating its center at the pin 35 as shown in FIG. 3, and contacts with a corresponding concave surface formed on the internal tooth 6a. The other end of the cam surface 34 projects acutely at its disc inner peripheral side to form a projecting part 34b (FIG. 5), and the external tooth 5a is formed approximately correspondingly to the shape of the cam surface 34 through a slight circumferential play. Incidentally, the pin 35 is positioned near to a concave part 34a (FIG. 5) formed at the disc outer peripheral side in respect of the cam surface 34.

While, among disc-like seats 40 and 41 provided on disc circumferential both ends of the second torsion spring 21, the seat 40 apart from the cam 33 is made of a spring steel and integrally has a leaf spring 42 extending substantially along the spring 21 at a disc inner peripheral side. A tip end of the spring 42 is curved and, under the state shown in FIG. 3, presses on a part nearer to the seat 40 than the pin 35 with respect to the concave part 34a of the cam surface 34.

Function of the damper disc will be described hereunder. When the not-shown pressure plate presses the facing 32 onto the engine flywheel, a torque is transmitted from the flywheel through the facing 32, the plate 31, the plate 18, the spring 21, the outer side flange 4, the spring 12, the inner side flange 3, and the hub 1 to the output shaft. In this instance, a rotating direction of the disc is as indicated by the arrow $X_1$ of FIG. 3.

Figure 1:
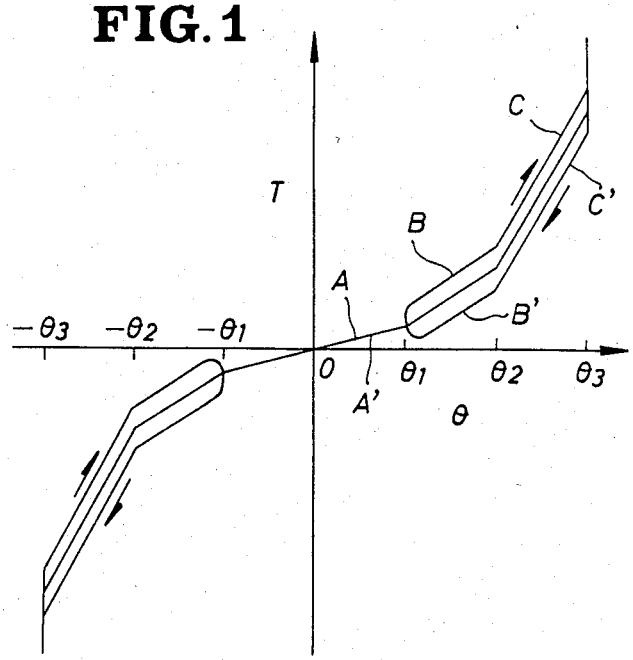
FIG. 1 and FIG. 7 are graphs showing twist-angle/twist-torque characteristics.

Here, if a twist torque of $X_1$ direction is applied on the facing 32 relatively to the spline hub 1 for instance, the damper disc will function as follows to absorb a torque vibration. The function will be described hereunder on the basis of FIG. 1 showing the twist-angle $\theta$/twist-torque T characteristic.

(First stage)

In case when the facing 32 is twisted relatively to the hub 1 from the neutral state in the $X_1$ direction, the rigidity of the second torsion spring 21 is set higher than that of the first spring 12 in a range between $0 \sim \theta_1$ of twist angle $\theta$, so that the spring 21 acts as a rigid body to rotate the plate 18 integrally with the outer side flange 4. As the result, a torsion is produced between the outer side flange 4 and the inner side flange 3, the spring 12 is compressed through the sub-plates 9 and 9', and a slip occurs on a surface of the friction material 10 to produce a slight friction torque, thus a relation A of FIG. 1 being obtainable.

Figure 6:
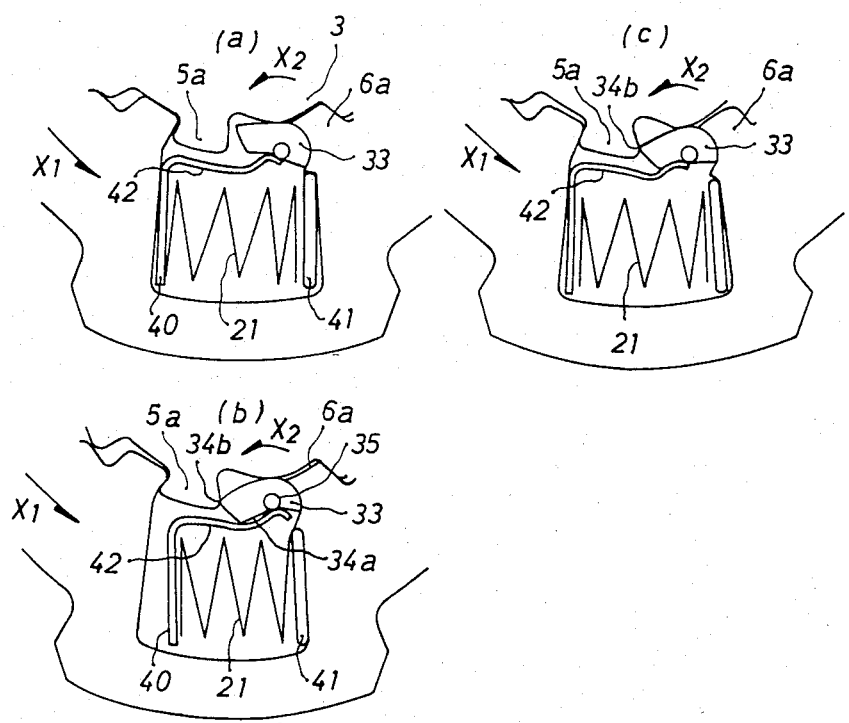
FIG. 6 is a schematic partial front view showing an operating state.

A state where the damper disc is twisted up to an angle $\theta_1$ is shown in FIG. 6(a). The external tooth 5a contacts with the internal tooth 6a in FIG. 6(a), however, the cam 33 is restricted by the spring 42 at its seat 40 side portion so as to be permitted by the inner side flange 3 only to rotate slightly in the $X_2$ direction.

(Second stage)

When the spring 12 of FIG. 3 is compressed to cause contact of each end face of the internal tooth and the external tooth, the torsion does not progress any more between the internal tooth 5 and the external tooth 6. Consequently, the outer side flange 4 is twisted relatively to the plate 18 in a range between $\theta_1 \sim \theta_2$ of twist angle $\theta$, the spring 21 is compressed, and a slip occurs on a surface of the washer 16 to produce a friction torque, thus a relation B of FIG. 1 being obtainable. A torsion of the plate 18 relative to the outer side flange 4 minimizes a circumferential clearance between the outer side flange 4 and the spring 25 of FIG. 3, thus the twist angle $\theta$ becomes $\theta_2$ when the clearance becomes zero.

In this instance, the plates 17 and 18 compress the spring 21 through the seat 40 and the seat 40 moves inside the hole 20 in the $X_1$ direction. With the movement of the seat 40 the tip end of the spring 42 slides on the concave part 34a of the cam 33 as shown in FIG. 6(b), and the cam 33 is rotated by a force of the spring 42 in the $X_2$ direction when the spring moves toward the seat 41 side beyond the pin 35. The projecting part 34b of the cam surface 34 substantially contacts with the tooth 5a under the state of FIG. 6(b).

(Third stage)

Both second and third springs 21 and 25 are compressed in a range between $\theta_2 \sim \theta_3$ of twist angle $\theta$, and a relation C of FIG. 1 is obtainable. When the twist angle $\theta$ becomes $\theta_3$, the stop pin 19 contact with a circumferential end face of the notch 29 and the plate 18 becomes integral with the outer side flange 4 through the stop pin, so that the torque is transmitted directly to the hub 1.

(When returning from the max. twist angle $\theta_3$)

Figure 7:
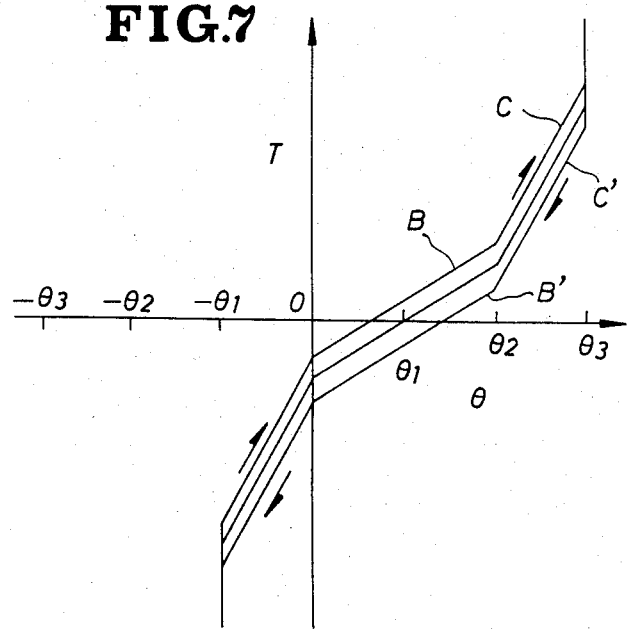

(a) For large returning angular velocity: The cam 33 is held between the external tooth 5a and the internal tooth 6a with a strong force when a torque is abruptly applied in the direction opposite to $X_1$ from the state of FIG. 6(b). Therefore, the cam 33 does not rotate in the direction opposite to $X_2$ even when an urging point of the leaf spring 42 returns to the original position, and the torsion spring 12 (FIG. 3) is locked to the compressed state to be inoperative. Consequently, in this case the disc presents a characteristic having no low hysteresis torque area (first stage), and this characteristic becomes as shown in FIG. 7.

Incidentally, when the twist torque opposite to the $X_1$ direction becomes small from the above state, the cam 33 is rotated by the spring 42 in the direction opposite to $X_2$ to release the meshing therebetween so that the characteristic returns to that shown in FIG. 1.

(b) For small returning angular velocity: When a torque is slowly applied in the direction opposite to $X_1$ from the state of FIG. 6(b), the spring force of the leaf spring 42 overcomes the holding force of the cam 33 because this force exerted by the respective teeth 5 and 6 is weak, thus the cam 33 rotates in the direction opposite to $X_2$. As the result, there is no case that the torsion spring 12 (FIG. 3) becomes locked. Therefore, the characteristic shown in FIG. 1 is obtainable in this instance.

In case when the disc is twisted in the direction opposite to $X_1$ from the neutral state, the clearance between the external tooth 5a and the cam 33 is closed when the inner side flange 3 is twisted relatively to the outer side flange 4, so that there is no case that the inner side flange 3 and the outer side flange 4 become locked regardless of a magnitude of the twist angular velocity. Consequently, the characteristic of FIG. 1 is always obtainable regardless of the twist angular velocity.

(Effect of the Invention)

The cam 33 freely rotatable about the axis parallel to the disc center line $0_1$—$0_1$ is provided between the external tooth 5 and the internal tooth 6 through a disc circumferential play; the longitudinal portion of the cam is made engage between said external tooth 5 and the internal tooth 6 when a torsion is produced between the inner side flange 3 and the outer side flange 4; and the spring member (the spring 42, for example) is provided, which elastically urges the cam 33 to such the extent that the cam longitudinal portion is kept engaged when the angular velocity at which said torsion is released is high and the portion is disengaged when the angular velocity is low; so that the following effects can be expected.

(a) In case when the twist torque changes abruptly, such the twist-angle $\theta$/twist-torque T characteristic can be obtained that the state of torque moves directly to the minus side second-stage rigidity area without passing the first-stage rigidity area having the low twist torque and low hysteresis torque characteristic when returning from the high twist angle range.

(b) Therefore, in case of employing the damper disc in a vehicle clutch disc, there is an advantage that the torque fluctuation can be surely absorbed without inducing or aggravating troubles such as the rolling of vehicle body etc. even when the abrupt torque fluctuations such as the tip-in/tip-out occur.

(Another embodiment)

Figure 8:
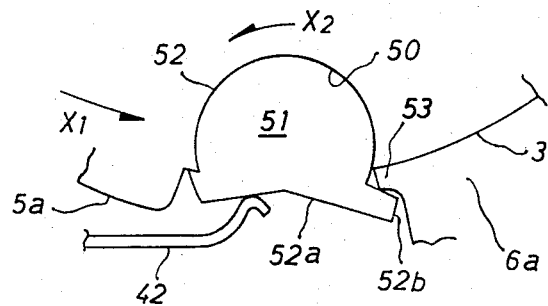
FIG. 8 is a schematic partial front view of another embodiment.

(a) As shown in FIG. 8, a circular arc concave portion 50 may be formed on an outer peripheral surface of the inner side flange 3 to fit a substantially disc-like cam 51 in the concave portion 50 to support it rotatably. A disc outer peripheral side of the cam 51 is so notched away that its central portion is recessed to the maximum extent to form a concave part 52a of the cam surface 52. A projecting part 52b is formed on an internal tooth 6a side end of the cam 51, and a projection 53 projecting toward the cam 51 side is formed on an inner peripheral part of the internal tooth 6a. The tip end of the leaf spring 42 presses on the concave part 52a, and the cam 51 is so adapted as to rotate in the direction of or opposite to $X_2$ according to a change of a contacting position of the spring 42. Further, when the disc is twisted, both tip ends of the projection 53 and the projecting part 52b mesh each other.

(b) Under the state of FIG. 6(b), it may be so arranged that a clearance is left between the external tooth 5a and the cam 33. In this instance, the A and A' characteristics of FIG. 1 become effective by the amount of that clearance.

What is claimed is:

1. A damper disc assembly wherein an outward flange of a hub is divided into an inner side flange and an outer side flange, an external tooth of the inner side flange meshes with an internal tooth of the outer side flange with circumferential clearances provided therebetween and the inner side flange is elastically connected to the outer side flange through a weak torsion spring a center line of which extends in a circumferential direction, side plates are disposed on both sides of the flanges and at the same time the outer side flange is elastically connected to the side plates through a strong second torsion spring extending in the circumferential direction; characterized by that a cam freely rotatable about an axis parallel to a disc center line is provided between said internal tooth and said external tooth, a longitudinal portion of the cam engages between said external tooth and said internal tooth when a torsion is produced between the inner side flange and the outer side flange, and a spring member is provided, which elastically urges the cam to such an extent that the cam longitudinal portion is kept engaged when an angular velocity at which said torsion is released is high and the portion is disengaged when the angular velocity is low.

2. A damper disc assembly as set forth in claim 1, in which said cam has a cam surface having a complex curved shape and integrally has a pin projecting to both sides thereof, and the pin is fitted in and rotatably supported by holes formed on the sub-plates fastened to the outer side flange and holding the inner side flange from both sides in such a position parallel to the disc center line.

3. A damper disc assembly as set forth in claim 2, in which a disc circumferential end portion of said cam surface is formed into a circular arc locating its center at said pin and contacts with a concave surface formed on said internal tooth, a disc inner peripheral side of the other end of the cam surface projects acutely to form a projecting part, said external tooth is formed approximately correspondingly to the shape of the cam surface, and a concave part is formed on a disc outer peripheral side of the cam surface.

4. A damper disc assembly as set forth in claim 1, in which a circular arc concave portion is formed on an outer peripheral surface of said inner side flange, said cam is fitted in the concave part to be supported rotatably, a disc outer peripheral side portion of the cam is so configured that its central part is recessed to a maximum extent to form a concave portion, a projecting part is formed at an internal tooth side end of the cam, and a projection projecting to side of the cam is formed on an inner peripheral part of the internal tooth.

5. A damper disc assembly as set forth in claim 3 or claim 4, in which disc-like seats are provided at both circumferential ends of said second torsion spring, a seat apart from said cam is formed of a spring steel as said spring member, said spring member extending along an inner peripheral side of said second torsion spring, with a tip end of said spring member pressing on the concave part of said cam.

* * * * *